(12) United States Patent
Mao

(10) Patent No.: US 11,870,377 B2
(45) Date of Patent: Jan. 9, 2024

(54) MULTI-PHASE MOTOR/GENERATOR SYSTEM WITH HARMONIC INJECTION

(71) Applicant: Quantentech Limited, Grand Cayman (KY)

(72) Inventor: Hengchun Mao, Allen, TX (US)

(73) Assignee: Quantentech Limited, Grand Cayman (KY)

( * ) Notice: Subject to any disclaimer, the term of this patent is extended or adjusted under 35 U.S.C. 154(b) by 497 days.

(21) Appl. No.: 16/724,914

(22) Filed: Dec. 23, 2019

(65) Prior Publication Data

US 2020/0204099 A1 Jun. 25, 2020

Related U.S. Application Data

(60) Provisional application No. 62/784,611, filed on Dec. 24, 2018.

(51) Int. Cl.
| | |
|---|---|
| H02P 21/24 | (2016.01) |
| H02P 21/22 | (2016.01) |
| H02P 21/10 | (2016.01) |
| H02P 27/12 | (2006.01) |
| H02P 25/22 | (2006.01) |
| H02P 25/20 | (2006.01) |

(52) U.S. Cl.
CPC ............ *H02P 21/22* (2016.02); *H02P 21/10* (2013.01); *H02P 25/20* (2013.01); *H02P 25/22* (2013.01); *H02P 27/12* (2013.01)

(58) Field of Classification Search
CPC .......... H02P 21/10; H02P 25/20; H02P 25/22; H02P 27/12; H02P 21/06; H02P 21/22
USPC .......................................................... 318/503
See application file for complete search history.

(56) References Cited

U.S. PATENT DOCUMENTS

| | | | | |
|---|---|---|---|---|
| 5,569,995 | A * | 10/1996 | Kusaka | H02P 21/22 318/717 |
| 6,570,361 | B1 * | 5/2003 | Edelson | H02P 29/50 318/807 |
| 6,710,495 | B2 * | 3/2004 | Lipo | H02K 3/28 310/184 |
| 7,164,253 | B2 | 1/2007 | Sato et al. | |
| 8,278,850 | B2 * | 10/2012 | Gallegos-Lopez | H02M 7/53873 318/400.17 |
| 9,240,748 | B2 * | 1/2016 | Mao | H02P 25/18 |
| 10,136,482 | B1 * | 11/2018 | Zhang | H05B 45/3575 |
| 2009/0153087 | A1 * | 6/2009 | Lim | H02P 21/14 318/400.15 |
| 2014/0121867 | A1 * | 5/2014 | Tamai | B60W 10/08 180/65.265 |
| 2015/0270799 | A1 * | 9/2015 | Toliyat | H02P 29/60 318/474 |

(Continued)

*Primary Examiner* — Kawing Chan
*Assistant Examiner* — Gabriel Agared
(74) *Attorney, Agent, or Firm* — AP3 Law Firm PLLC

(57) ABSTRACT

A system includes a motor having a plurality of windings, a rotor and a stator magnetically coupled to the rotor, a plurality of power inverters connected to respective windings, wherein the plurality of power inverters is configured to control currents of the plurality of windings, and a controller configured to determine an injection ratio of a high-order harmonic component to a fundamental component based on a performance index, and wherein the injection ratio for a magnetizing component is different from the injection ratio for a torque component at a same harmonic frequency.

20 Claims, 10 Drawing Sheets

(56) References Cited

U.S. PATENT DOCUMENTS

2017/0133960 A1\* 5/2017 Takahashi ............ H02P 25/022
2017/0179863 A1\* 6/2017 Lamsahel ............ G01R 31/343
2018/0085507 A1\* 3/2018 Casas .................. A61M 60/824

\* cited by examiner

MULTI-PHASE MOTOR/GENERATOR SYSTEM WITH HARMONIC INJECTION

This application claims the benefit of U.S. Provisional Application No. 62/784,611, filed on Dec. 24, 2018, entitled "Field-Oriented Optimization and Harmonic Injection for Multi-Phase Motor/Generator Systems," which application is hereby incorporated herein by reference.

TECHNICAL FIELD

The present disclosure relates to an electric drive system, and, in particular embodiments, to innovative technologies which improve the performance of electric drives.

BACKGROUND

High performance motor and generator systems are widely required for many industrial, automotive and consumer applications. The design and material of a motor usually have non-linear effects such as magnetic saturation of silicon steel lamination and other magnetic materials, and space harmonics of the air-gap magnetic field due to winding patterns and/or the magnet shape and placement. To achieve a high performance motor/generator and drive system, various harmonic injection techniques may be utilized. Traditionally, the harmonic injection techniques have been used mainly to improve the voltage capability of power inverters, and to increase the torque density of permanent magnet motors/generators. The harmonic injection impact on other performance indexes has not been fully investigated, especially for induction machines. This disclosure presents a field-oriented harmonic injection control mechanism. In particular, field-oriented performance indexes are employed to consider the overall system performance, especially the efficiency and power loss to further improve the operation of the motor/generator system.

SUMMARY

These and other problems are generally solved or circumvented, and technical advantages are generally achieved, by preferred embodiments of the present disclosure which provide a high performance implementation of a motor drive system through injecting high-order harmonics.

In accordance with an embodiment, a method comprises configuring a motor drive system with a motor and an inverter, injecting a plurality of high-order harmonic currents into motor windings of the motor drive system, and configuring the high-order harmonic currents to function as synchronous harmonic currents, wherein the synchronous harmonic currents are configured to increase a torque of the motor.

In accordance with another embodiment, a system comprises a motor having a plurality of windings, a rotor and a stator magnetically coupled to the rotor, a plurality of power inverters connected to respective windings, wherein the plurality of power inverters is configured to control currents of the plurality of windings, and a controller configured to determine an injection ratio of a high-order harmonic component to a fundamental component based on a performance index, and wherein the injection ratio for a magnetizing component is different from the injection ratio for a torque component at a same harmonic frequency.

In accordance with yet another embodiment, a method comprises configuring a motor drive system with a motor and an inverter, wherein the motor has a plurality of windings arranged into a plurality of winding groups, and the inverter has a plurality of power converter groups, and wherein each power converter group is configured to control currents of a winding group, injecting a plurality of high-order harmonic currents into the plurality of windings of the motor, and configuring the motor drive system such that at least one of the high-order harmonics functions as a synchronous harmonic, wherein the synchronous harmonic is configured to enhance a torque of the motor drive system.

An advantage of an embodiment of the present disclosure is using high-order harmonics to improve the operation performance of a motor drive system.

The foregoing has outlined rather broadly the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless other-

DETAILED DESCRIPTION OF ILLUSTRATIVE EMBODIMENTS

The making and using of the presently preferred embodiments are discussed in detail below. It should be appreciated, however, that the present disclosure provides many applicable inventive concepts that can be embodied in a wide variety of specific contexts. The specific embodiments discussed are merely illustrative of specific ways to make and use the disclosure, and do not limit the scope of the disclosure.

The present disclosure will be described with respect to preferred embodiments in a specific context, namely a high-performance motor drive system. The motor drive system may be applied to a variety of electric or hybrid vehicles, robots, drones, appliances, industrial drives, and/or other applications. Throughout the description, dynamically reconfigurable induction motors (e.g., multi-phase induction motors) are used as an example, but the technology discussed generally can be applied to other machines such as conventional induction machines, permanent magnet motors, reluctance motors (e.g., switched reluctance motors or synchronous reluctance motors), and various generator counterparts. Hereinafter, various embodiments will be explained in detail with reference to the accompanying drawings.

Figure 1:
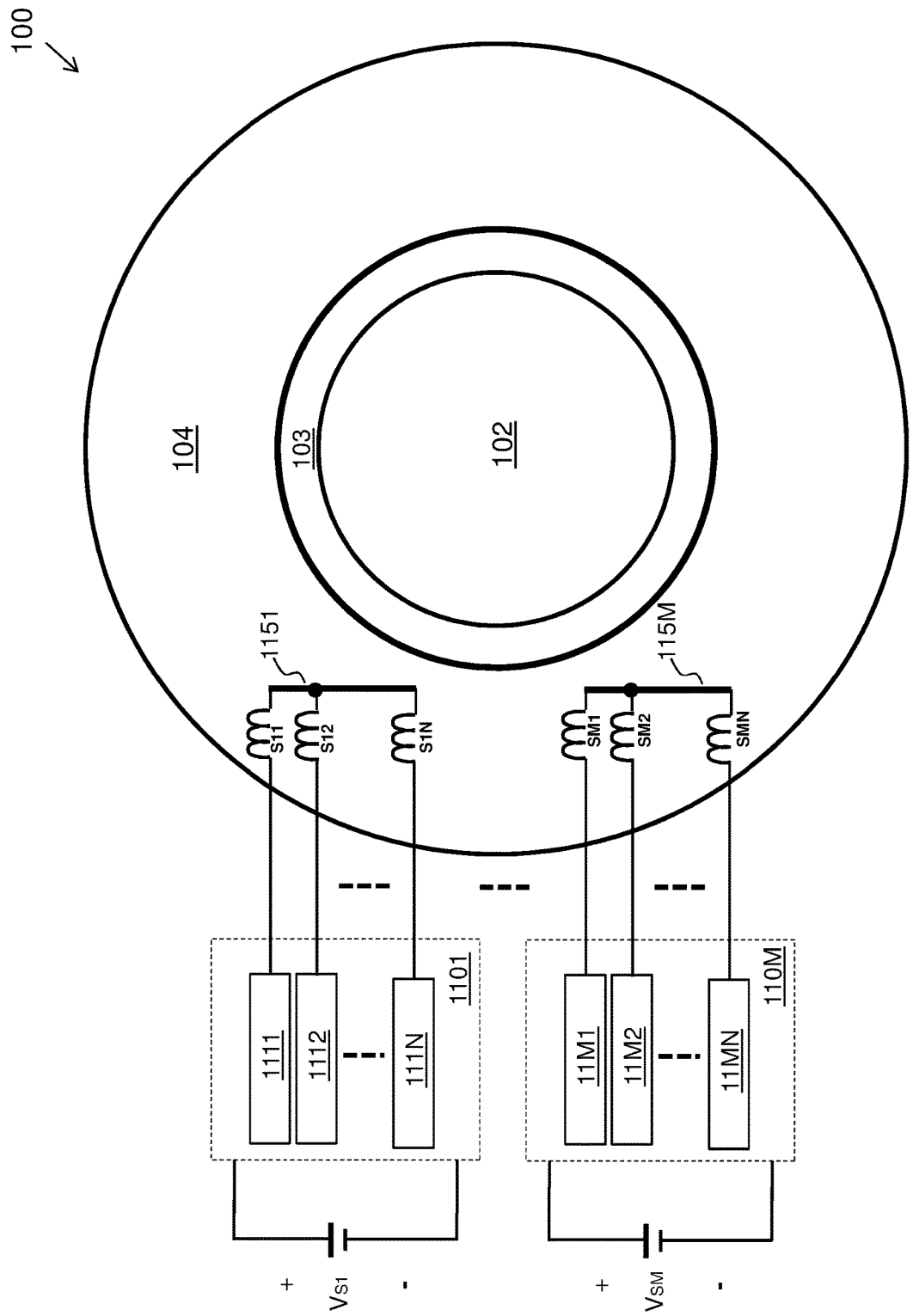
FIG. 1 illustrates a block diagram of a reconfigurable motor system in accordance with various embodiments of the present disclosure.

Multi-phase induction motors may be dynamically reconfigured to have different number of poles and different number of phases within a pair of poles through adjusting the phase shift between phase currents. The multi-phase induction motors may be alternatively referred to as dynamically reconfigurable induction motors (DRIM). There are different ways to arrange the windings in the DRIM. FIG. 1, as an example, is used to explain various embodiments of the present disclosure without limiting the scope of the present disclosure to this particular construction (e.g., DRIM).

FIG. 1 illustrates a block diagram of a reconfigurable motor system in accordance with various embodiments of the present disclosure. The reconfigurable motor system 100 comprises a stator 104, a rotor 102 and an air gap 103. The rotor 102 may have a squirrel cage construction. The stator 104 comprises a plurality of stator windings. The plurality of stator windings may be embedded in the stator core. More particularly, the stator core may comprise a plurality of slots. Each slot is employed to accommodate one stator winding. Alternatively, depending on different applications and design needs, each slot may be employed to accommodate multiple stator windings. In addition, the reconfigurable motor system may not include a stator core (e.g., a coreless motor), or there is no slot in the stator core.

As shown in FIG. 1, the plurality of stator windings may be divided into M groups, where M is a predetermined integer. The stator windings of each group are connected by a connection ring or a connection bar. For example, the stator windings S11-S1N of the first group are connected by a first connection ring 1151 as shown in FIG. 1. Likewise, the stator windings SM1-SMN of the mth group are connected by an Mth connection ring 115M as shown in FIG. 1. In FIG. 1, the connection rings are shown floating (e.g., the connection rings are isolated from each other as shown in FIG. 1). In this disclosure, a connection ring may not be an enclosed shape, and thus can be a connection bar. If some of the M input power sources are isolated from each other, some of the connection rings 1151-115M may be electrically connected together, or form a single connection ring.

Furthermore, the reconfigurable motor system 100 comprises a plurality of power converter groups. Each power converter group is connected between a power source and a corresponding stator winding group. As shown in FIG. 1, a first power converter group 1101 is connected between a first power source VS1 and the first group of the stator windings S11-S1N. The first power converter group 1101 comprises a plurality of power converters 1111-111N as shown in FIG. 1. Likewise, an Mth power converter group 110M is connected between an mth power source VSM and the mth group of the stator windings SM1-SMN. The Mth power converter group 110M comprises a plurality of power converters 11M1-11MN as shown in FIG. 1. In some embodiments, the plurality of power converters is divided into a plurality of power converter groups sequentially.

In some embodiments, the power sources VS1-VSM are separate power sources as shown in FIG. 1. In alternative embodiments, the power sources VS1-VSM may be connected in series to accommodate a high input voltage applied to the reconfigurable motor system 100. Furthermore, the power sources VS1-VSM may be developed from capacitors connected in series and coupled to a common power source. Thus, it may be important to achieve a charge balance among the power sources. In order to accomplish a charge balance of the power sources connected in series, it is desirable that the dc currents flowing in/out of the power sources are equal or approximately equal (e.g., within 20% tolerance) to each other.

In some embodiments, the power sources can perform efficiently and reliably when the current flowing through each power source is a dc current or a current having low low-frequency components. For example, the harmonic components (e.g., the fundamental and the low order harmonics) of the current should be reduced down to the minimum. In some embodiments, each winding group should have at least three stator windings evenly spaced in a pair of poles. The stator windings are configured to conduct currents with the same amplitude and frequency. Furthermore, the phase angles of the currents are evenly distributed among the stator windings. As a result, the stator windings in each winding group form a symmetrical and balanced multi-phase system, and the current flowing through each power source is a dc current in ideal operation.

In operation, each phase winding is controlled to conduct a desired current by a power converter. A desirable magnetic field can be established in the air gap 103 between the stator 104 and the rotor 102 by controlling the currents in the phase windings (phase currents), or more accurately by controlling the magnetizing components of the phase currents. The phase windings may be divided into several groups, each group may be coupled to a power source through a plurality of power inverters, where multiple power inverters may form and be controlled as a multi-phase inverter if desired. A phase winding may be a conductor in a slot, or may be formed as concentrated or distributed windings with various structures. The multiple windings may be put in series or in parallel if desired. When the phase shift between the phase currents (the currents in the phase windings) may be changed, different number of poles and number of phases can be obtained. The field-oriented harmonic injection technique can be examined and applied for each pole-phase configuration in such a system.

In some embodiments, reconfigurable motor system 100 has N phase windings in the stator arranged into P pairs of poles in a symmetrical fashion. The number of phases M is equal to N divided by P (N/P). The fundamental phase displacement angle (phase shift) can be expressed as:

$$\theta 1 = (360° \cdot P)/N \quad (1)$$

In comparison with a traditional structure of the induction machine in which the windings within each pair of poles are fixed by the predetermined construction and design, in the dynamically reconfigurable structure such as the one shown in FIG. 1, the number of phases M may be an integer or not an integer. For example, a motor may have 16 phase windings which may be placed into six poles. As a result, each pair of poles has 5.33 phases (16/3). This is a split-phase construction. In other words, a pair of poles sometimes has five phases, and sometimes has six phases.

One advantageous feature of having the split-slot pole construction is the asymmetry between different pairs of poles exists at any particular time, and this kind of asymmetry may be used advantageously to create an additional torque similar to the effect of the reluctance variation. The availability of split-phase configurations in a DRIM gives more flexibility to improve the design of the DRIM.

Figure 2:
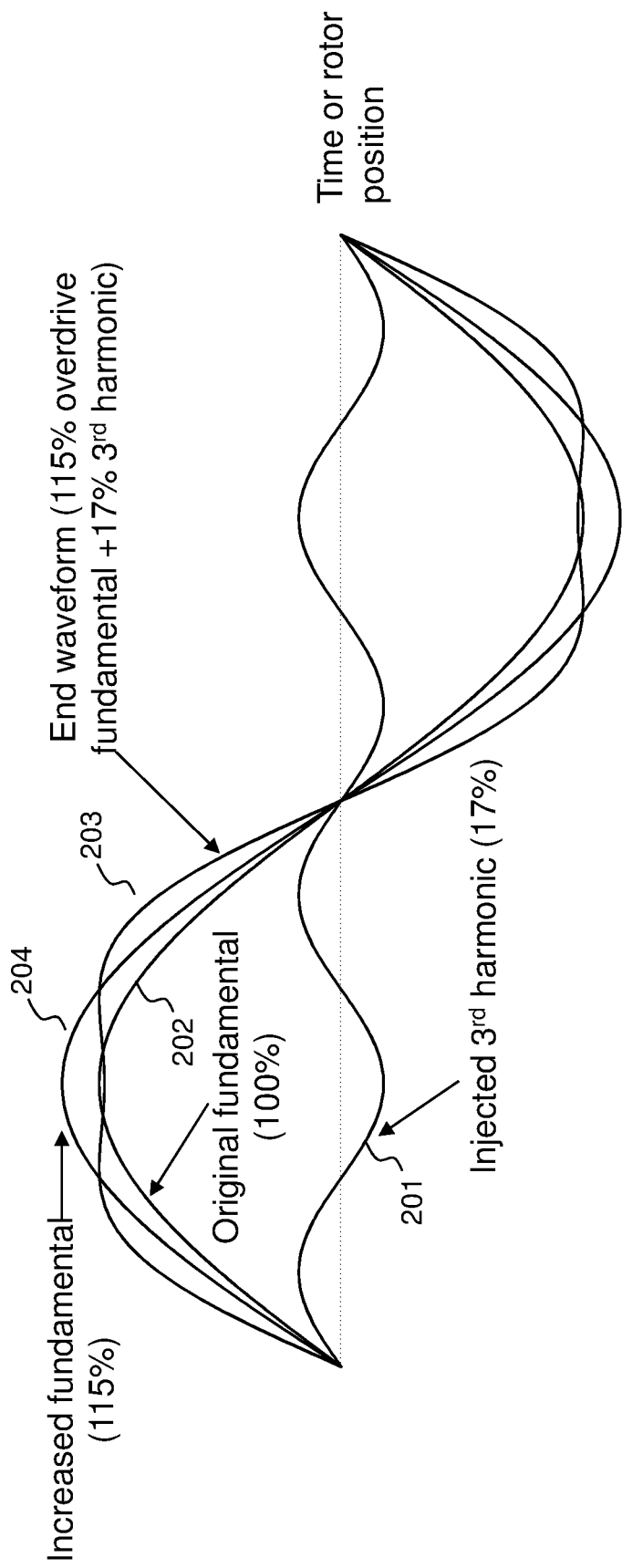
FIG. 2 illustrates an example of injecting a third-order harmonic into a fundamental waveform in accordance with various embodiments of the present disclosure.

FIG. 2 illustrates an example of injecting a third-order harmonic into a fundamental waveform in accordance with various embodiments of the present disclosure. For the DRIM shown in FIG. 1, one or more higher-order harmonics can be injected into a current component and/or a voltage component of the phase windings. In some embodiments, the fundamental frequency component of ith conductor (phase winding) current satisfies the following equation:

$$Ii1 = I1 \cdot \sin(2\pi f - i \cdot \theta 1) \quad (2)$$

where $\theta 1$ is the phase displacement angle for the fundamental frequency component.

In some embodiments, the injected jth harmonic component can be expressed as:

$$Iij = Ij \cdot \sin(j \cdot (2\pi f - i \cdot \theta 1)) \quad (3)$$

Equation (3) can be simplified as:

$$Iij = Ij \cdot \sin(2\pi j \cdot f - i \cdot j \cdot \theta 1) \quad (4)$$

As indicated by Equation (4), the phase displacement angle for the jth harmonic component is:

$$\theta j = j \cdot \theta 1 \quad (5)$$

In some embodiments, if the jth harmonic can satisfy the following equation, the jth harmonic applied to the motor forms a balanced system having the number of pole pairs equal to j times P.

$$N/(j \times P) \geq 3 \quad (6)$$

The synchronous speed for the jth harmonic can be expressed as:

$$S_j = 60 \cdot j \cdot \frac{f}{j \cdot P} = 60 \cdot f/P \quad (7)$$

As indicated by Equation (7), the synchronous speed $S_j$ for the jth harmonic is the same as the synchronous speed of the fundamental component.

In some embodiments, if the phase displacement angle $\theta_j$ is less than 180°, the current of the jth harmonic in the motor may establish a rotating magnetic field with the same mechanical speed and direction as the fundamental frequency current. Since the jth harmonic and the fundamental component have the same speed and direction, the jth harmonic is also referred to as a synchronous harmonic. When the rotor rotates in this synchronous harmonic magnetic field, the slip rate for the jth harmonic is the same as that of the fundamental frequency, and the induced currents and voltages by the harmonic magnetic field in the rotor windings are not excessive in steady-state operation, thereby avoiding a significant shortcoming of the traditional harmonic injection techniques applied to induction machines.

This synchronization between the harmonic magnetic field and the fundamental magnetic field can also be used to increase the mechanical torque output of the motor. The harmonic currents may increase the torque density and possibly also the efficiency of the motor.

It should be noted that while FIG. 2 illustrates a single harmonic injected into the fundamental waveform, the motor system could accommodate any number of harmonics. Furthermore, although a non-synchronous harmonic can also be injected into the fundamental waveform, it is better to inject synchronous harmonics into the fundamental waveform in order to improve the performance of the motor.

FIG. 2 shows an example of injecting a third-order harmonic into the fundamental waveform. The horizontal axis represents a time or space (e.g., rotor position or angle). A time waveform is used in the following discussion. An advantage of injecting harmonics is to alleviate the magnetic saturation in a motor. The injection of the third-order harmonic helps to increase the fundamental flux linkage without increasing the saturation level of the magnetic material. It is well known that by injecting about 17% of the third-order harmonic, the amplitude of the fundamental component can be increased by 15% as indicated by waveform 204. With such an injection ratio, the waveform 203 including both the third-order harmonic and the fundamental component has the same peak value as the fundament component. As shown in FIG. 2, the waveform 203 has a relatively flat top with two small fluctuations. More higher-order harmonics may be injected to establish a desired waveform of a current, which in turn achieves a desired performance of the motor or the drive system.

In some embodiments, the field-oriented control mechanism can be applied to the harmonic injection to further improve the performance of the motor. As is well known in the industry, a current in a motor winding can be divided into a magnetic component and a torque component, and the currents in a set of windings can be transferred into two orthogonal components (d-q frame), namely a magnetizing component and a torque component. In the d-q synchronous frame of the motor control system, the magnetizing component is represented by $I_d$, while the torque component is represented by $I_q$. Through applying the field-oriented control to the harmonic injection, the magnetizing component and the torque component can be controlled individually or in combination. For example, the injection ratios (the ratio of the amplitude of the harmonic component to the amplitude of the fundamental component) for the magnetizing components ($K_{dj}$ for jth harmonic) and for the torque components ($K_{qj}$ for jth harmonic) may be different, and independently adjustable to further improve the performance of the motor system. The selection of the injection ratios ($K_{dj}$ and $K_{qj}$ for jth harmonic) can be determined based on a plurality of performance indexes described below.

The performance of the motor system may be indicated by a complex factor such as the efficiency of the motor, the efficiency of the inverter and/or the efficiency of the system. In order to help the design and provide a guideline for achieving real time optimization during operation, a performance index based on the understanding of the motor and the associated system operation is employed to control the operation of the motor system. A physics-based performance index should be created based on a model of the motor and the system utilizing various methods such as analysis, simulation, and/or testing data. The model can be set up offline and may evolve with more data including information and data from other similar systems using artificial intelligence (machine leaning) algorithms or other methods. After a model is established and a performance index is chosen, the online optimization can be easily implemented without much computation burden.

In some embodiments, a major objective in a motor drive system is to obtain the maximum torque within a certain power loss budget of the motor, the inverter and/or the system, or to limit the temperature of a key component of the system.

The mechanical torque (T) from an induction motor is proportional to $\Sigma K t j * I_{dj} * I_{qj}$, where j represents the jth harmonic component which exists in the winding currents of the motor (including the fundamental component with j=1), and Ktj is a torque coefficient for the jth harmonic. At least four performance indexes can be used to determine the ratio of the harmonic injection, thereby improving the operation of the motor system.

In some embodiments, a first performance index can be implemented as the current flowing through the motor. The root-mean-square (RMS) value of each winding current may be calculated from the following equation:

$$Irms^2 = \Sigma Z(I_{dj}^2 + I_{qj}^2) \tag{8}$$

The power loss in the motor and the inverter is strongly dependent upon Irms. As a result, the power loss is more or less proportional to $Irms^2$. Therefore, it may be desirable to use the following index (Kc) for optimizing the injection of the harmonic currents:

$$Kc = T/Irms^2 \tag{9}$$

The performance index shown in Equation (9) can be used to show the improvement coming from the harmonic injection without knowing the details of the motor design. In an example, about 17% of third-order harmonic (the ratio of the amplitude of the third-order harmonic to the amplitude of the fundamental is equal to 17%) is injected to the magnetic component of a current for increasing the fundamental component of the magnetizing component by 15%. At the same time, no harmonic injection is applied to the torque component. Under this third-order harmonic injection, Kc is improved by 2.1% if the power factor at the fundamental frequency of the motor is 0.8. On the other hand, Kc is improved by 7.9% if the power factor at the fundamental frequency of the motor is 0.9. This indicates that the power factor of the motor has an impact on the performance improvement from the harmonic injection.

In some embodiments, a second performance index can be implemented as the power loss of the motor. The major electrical power losses in an induction motor include the stator winding loss, the core loss (e.g., iron loss mainly produced in the laminated steel sheets), and the rotor winding loss. In some embodiments, the stator winding loss is proportional to $\Sigma R_{sj}(I_{dj}^2 + I_{qj}^2)$. The core loss is approximately proportional to $\Sigma(R_{cj}I_{dj}^2)$. The rotor winding loss is proportional to $\Sigma R_{rj}I_{qj}^2$. Parameters $R_{sj}$, $R_{cj}$ and $R_{rj}$ are loss factors for the jth harmonic frequency, which can be obtained from various methods such as calculation, simulation and/or testing data. Therefore, the total electric power loss of the motor can be expressed as:

$$Pm = \Sigma(R_{dj} \cdot I_{dj}^2 + R_{qj} \cdot I_{qj}^2) \tag{10}$$

The total electric power loss shown in Equation (10) can be used as a performance index for improving the harmonic injection. More particularly, a motor power loss index can be defined as:

$$Km = T/Pm \tag{11}$$

In some embodiments, a third performance index can be implemented as the power loss of the inverter. The major electrical power losses in an inverter include the conduction loss and the switching loss of the power devices, and the conduction loss of other power components. Considering that the harmonic contents in phase (winding) currents are relatively small, and many components in the inverter, such as the power switches, are insensitive to the frequency in terms of the power loss, the power loss in the inverter can be expressed as:

$$Pinv = V_{inv} \cdot Irms + R_{inv} \cdot Irms^2 \tag{12}$$

$V_{inv}$ is a power loss factor which may be a function of the input dc voltage of the inverter and may reflect the switching loss of power switches as well as the conduction losses of insulated-gate bipolar transistors (IGBTs) and diodes. $R_{inv}$ may be a loss factor more associated with the conduction loss of the power components such as inductors, leads, and power metal-oxide-semiconductor field-effect transistors (MOSFETs) if the power switches are implemented as power MOSFETs. These power loss factors above may be obtained from various methods such as calculation, simulation and/or testing data.

The inverter power loss shown in Equation (12) can be used as a performance index for improving the harmonic injection. More particularly, an inverter power loss index can be defined as:

$$Kinv = T/Pinv \tag{13}$$

In some embodiments, a fourth performance index can be implemented as the system power loss. The system power loss is the sum of the motor power loss and the inverter power loss. The system power loss can be expressed as:

$$Psys = Pm + Pinv \tag{14}$$

The system power loss shown in Equation (14) can be used as a performance index for improving the harmonic injection. More particularly, a system power loss index can be defined as:

$$Ksys = T/Psys \tag{15}$$

The performance indexes above may use currents in the d-q frame (magnetizing component and torque component) as variables. Therefore, the performance indexes are field-oriented, and synergetic with various field-oriented control mechanisms. Using an appropriate performance index, the injection factors Kdj and Kqj can be determined accordingly so as to optimize a performance parameter. In this way, the field-oriented harmonic injection can significantly improve the system performance and/or reduce the system size, weight and cost.

It should be noted that a system may use a different performance index in a different operating mode. For example, if the temperature of the motor is close to a predetermined limit, the motor power loss index Km may be used. On the other hand, when the temperature of the inverter is close to the predetermined limit, the inverter power loss index Kinv may be used. Furthermore, if a winding current is close to a limit (for example, the current reaches the package limit of the power switches in the inverter), Kc shown in Equation (9) may be used. The system power loss index Ksys may be used when the main objective is to maintain high system efficiency and the loss models of the inverter and the motor exists. If the loss models for the inverter or the motor do not exist, Kc may be used to achieve reasonably good efficiency.

One advantageous feature of having the harmonic injection control mechanisms described above is to increase the usable fundamental flux (also known as overdrive) of the motor when needed.

Figure 3:
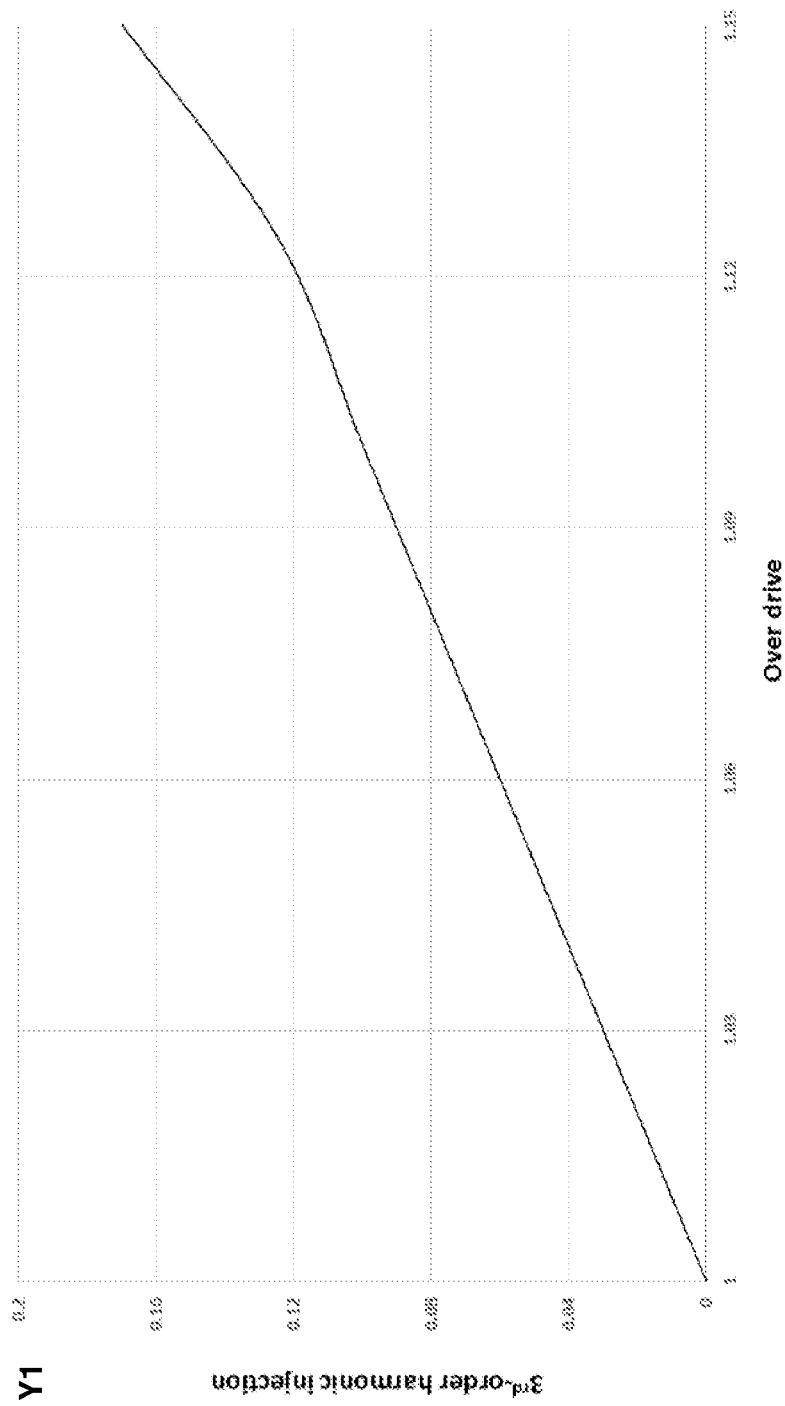
FIG. 3 shows the relationship between the third-order harmonic injection and the overdrive of the motor in accordance with various embodiments of the present disclosure.

FIG. 3 shows the relationship between the third-order harmonic injection and the overdrive of the motor in accordance with various embodiments of the present disclosure. During the overdrive, the peak value of the fundamental is kept the same. The horizontal axis represents the overdrive of the motor. The overdrive is equal to the desired increase of the amplitude of the fundamental component. For example, 1.15 means the amplitude of the fundamental component is increased by 15%. The vertical axis Y1 represents the ratio of the third-order harmonic to the fundamental. As shown in FIG. 3, the overdrive is proportional to the ratio of the third-order harmonic to the fundamental.

It should be noted that the harmonic injection may not be needed in most operating areas, and may be required for only part of the operation. In some implementations, the harmonic injection may be only applied to the magnetizing component for overcoming the saturation effect of the magnetic material. This can result in some performance improvements if the power factor of the motor is high. For example, if the power factor of the motor is higher than 0.71, the harmonic injection applied to the magnetizing component can achieve a better result in comparison with the traditional way of applying the harmonic injection to the whole phase current.

In an induction motor, the possible magnetic saturation areas include the stator yoke, the stator tooth, the rotor yoke and the rotor tooth. For each operation point, it is important to understand which area (or areas) is getting close to the saturation threshold, and consider the harmonic injection accordingly with the primary purpose of reducing the flux saturation in that area while increasing torque (power) capability and the performance accordingly to meet operation needs or a preset objective.

It should be noted that as the phase shifts of two phase currents at different harmonic frequencies are different, the ratio and phase difference of the flux in the tooth region and in the yoke region of the stator and the rotor are also different. The control system may change the phase shift to reduce the saturation of a yoke area. This is especially important for a dynamically reconfigurable machine because the pole number and the phase number are adjustable in operation, and the saturation region in the motor can dynamically change. For example, when the phase number is high (the pole number is low), a yoke area is easier to get into saturation. On the other hand, when the phase number is low, a tooth is most likely to saturate first.

Figure 4:
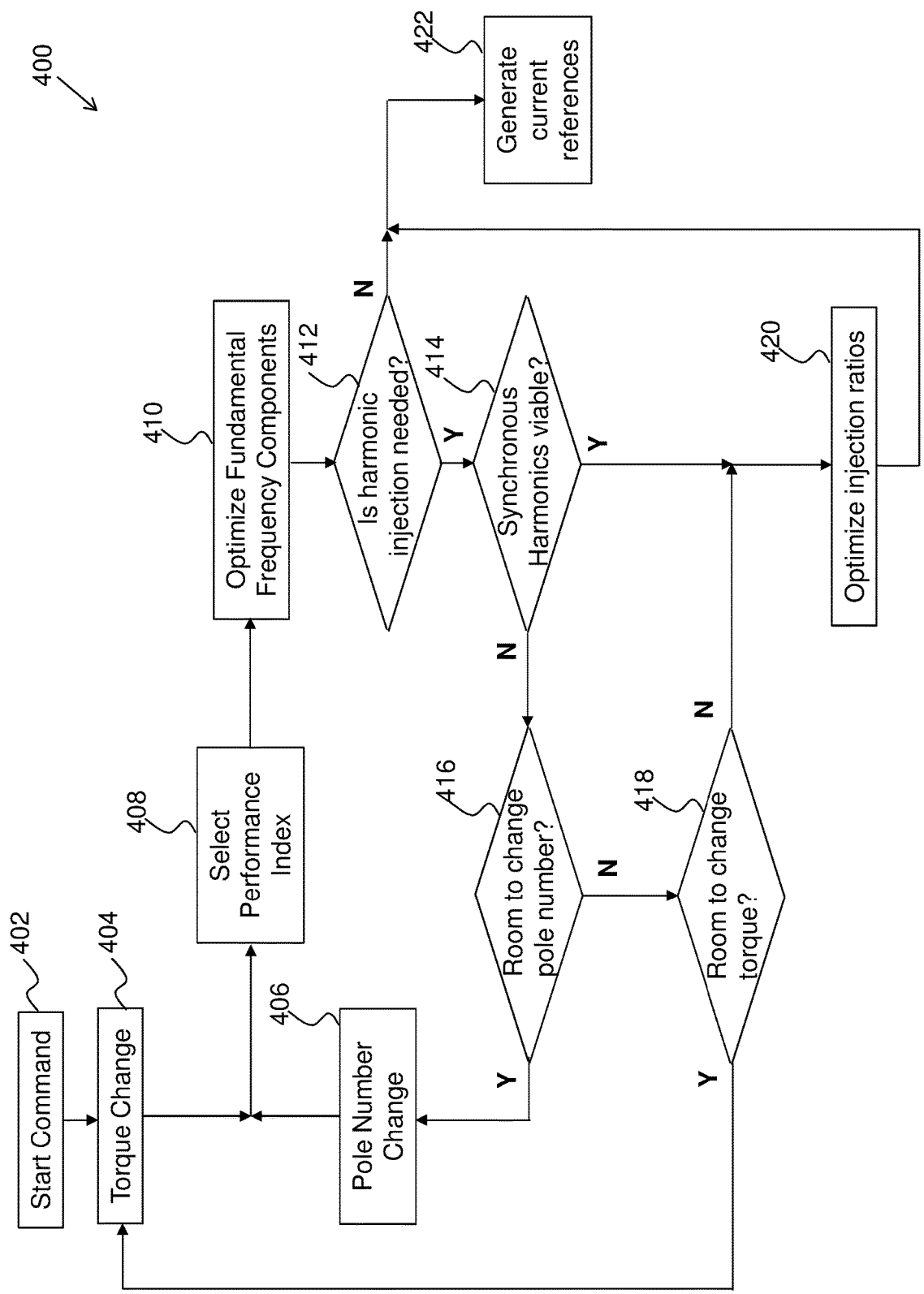
FIG. 4 illustrates a flow chart of a method for controlling the motor system shown in FIG. 1 in accordance with various embodiments of the present application.

FIG. 4 illustrates a flow chart of a method for controlling the motor system shown in FIG. 1 in accordance with various embodiments of the present application. This flowchart shown in FIG. 4 is merely an example, which should not unduly limit the scope of the claims. One of ordinary skill in the art would recognize many variations, alternatives, and modifications. For example, various steps as illustrated in FIG. 4 may be added, removed, replaced, rearranged and repeated.

FIG. 4 shows a method to optimize the harmonic injection using the field-oriented technique. The torque change may come from a field oriented control algorithm, or from a command device such as a throttle pedal or a button in a car. This method is designed to find the optimum torque components and magnetizing components for a given toque requirement in consideration with the harmonic injection. With this method, the pole number change (usually accompanying with the phase number change) is optional and may be implemented if desired, and the system is configured to do this change. Although the injection of a synchronous harmonic is usually desired, other harmonics may also be injected. This method can be implemented together with the field-oriented control of the motor drive system with some modifications.

The method 400 starts at step 402. At step 404, a controller determines whether the torque change has occurred. The torque change is associated with the speed change of the car. At step 406, the change of the pole number is generated. Both the torque change and the pole number change are fed into step 408.

At step 408, the controller determines which performance index is selected based on the torque change and the pole number change. The performance indexes have been described above with respect to FIG. 2, and hence are not discussed again herein.

The performance index is selected and fed into step 410. At step 410, based on the performance index, the controller optimizes the fundamental frequency components applied to the motor. After optimizing the fundamental frequency components, the method 400 proceeds to step 412.

At step 412, the controller determines whether the harmonic injection is needed. If the harmonic injection is needed, the method 400 proceeds to step 414. Otherwise, the method proceeds to step 422. At step 422, a plurality of current references may be generated for the field-oriented control scheme.

At step 414, the controller determines whether the synchronous harmonics are viable. It should be noted that the synchronous harmonics may generate a positive torque or a negative torque. If the synchronous harmonics generate a positive torque, the controller considers the synchronous harmonics as viable. Otherwise, the synchronous harmonics are not viable.

At step 414, if the synchronous harmonics are not viable, the method 400 proceeds to step 416. Otherwise, the method proceeds to step 420. At step 420, the controller optimizes the injection ratio and sends the optimized injection ratio for generating the current references at step 422.

At step 416, the controller determines whether there is room for changing the number of poles of the motor (or the number of phases if so desired) based on various operating parameters. If there is room for changing the number of poles, the method 400 proceeds to step 406 where the controller changes the number of poles. As described above, the new number of poles and the torque change information are fed into step 408. Also at step 416, if there is no room for changing the number of poles of the motor, the method 400 proceeds to step 418.

At step 418, the controller determines whether there is room for changing the torque of the motor based on various operating parameters. If there is room for changing the torque of the motor, the method 400 proceeds to step 404 where the controller changes the torque of the motor. Also at step 418, if there is no room for changing the torque of the motor, the method 400 proceeds to step 420.

Figure 5:
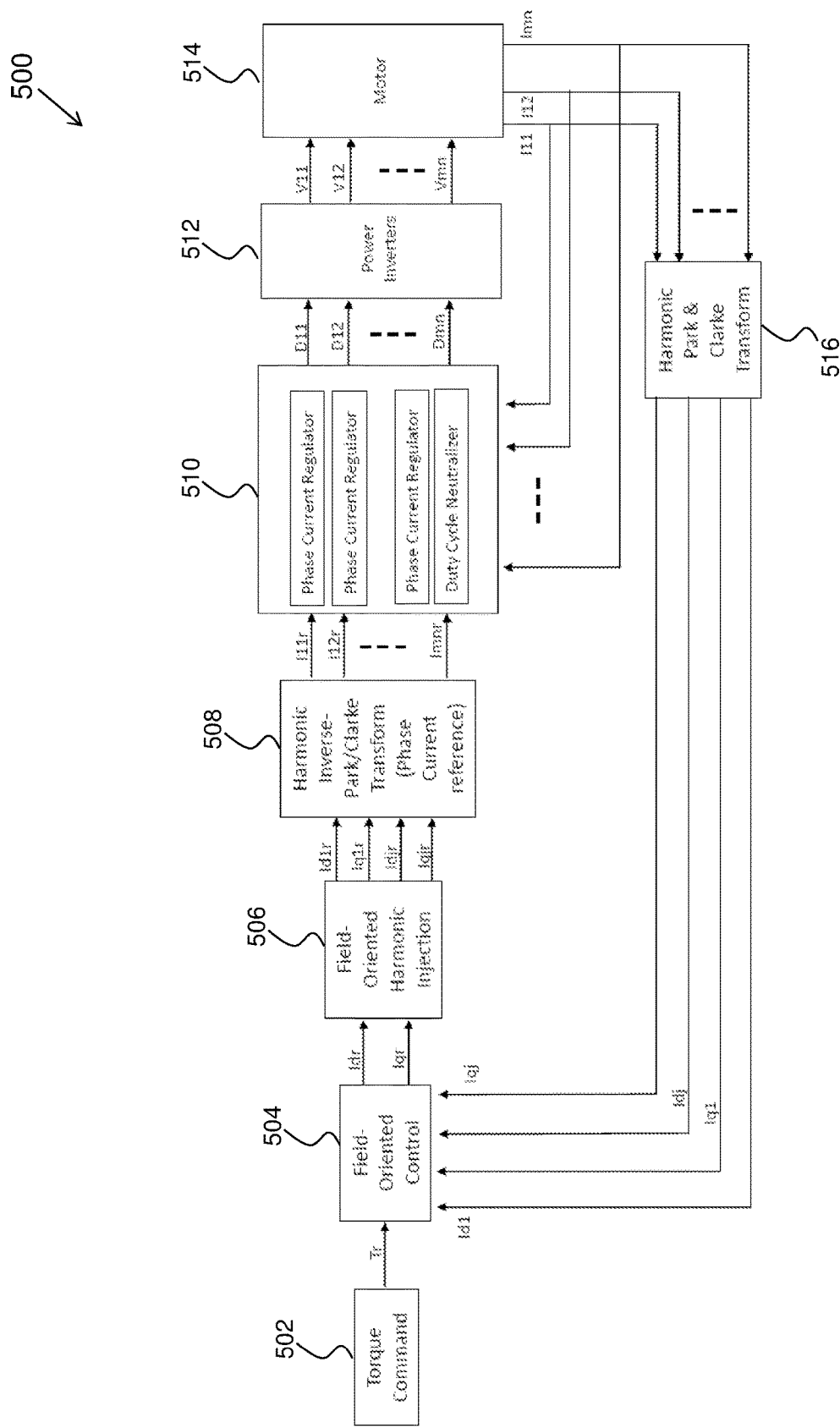
FIG. 5 illustrates a block diagram a motor system in accordance with various embodiments of the present disclosure.

FIG. 5 illustrates a block diagram a motor system in accordance with various embodiments of the present disclosure. The motor system 500 comprises a motor 514, a plurality of power inverters 512 and a control system. As shown in FIG. 5, the control system comprises a torque command unit 502, a harmonic Park & Clarke transform unit 516, a field-oriented control unit 504, a field-oriented harmonic injection unit 506, a harmonic inverse Park & Clarke transform unit 508 and a phase current control unit 510.

In operation, the harmonic Park & Clarke transform unit 516 receives the detected phase currents $I_{11}$ through $I_{nm}$ as shown in FIG. 5. The harmonic Park & Clarke transform unit 516 converts the phase currents into variables in an orthogonal stationary frame. More particularly, the harmonic Park & Clarke transform unit 516 converts the phase currents into their corresponding d-q frame variables through a suitable coordinate transfer method such as Park and Clarke matrixes at different harmonic frequencies. Coordinate transfer is a well-known technique in the motor control, and hence is not discussed herein. The harmonic Park & Clarke transform unit 516 generates current feedback signals including fundamental components Id1, Iq1, and jth-order harmonic components Idj, Iqj, which may be fed into the field-oriented control unit 504 for achieving field-oriented control.

The field-oriented control unit 504 is configured to generate a plurality of reference current signals based upon the variables in the orthogonal frame. In particular, the field-oriented control unit 504 may be employed to generate various references for winding currents. As shown in FIG. 5, the field-oriented control unit 504 is configured to receive a torque command Tr from the torque command unit 502. In the field-oriented control unit 504, the field-oriented control may be implemented only for the fundamental frequency. For example, the field-oriented control unit 504 may only consider the fundamental frequency components and generate the requirements for Idr and Iqr, which are fed into the field-oriented harmonic injection unit 506 as shown in FIG. 5. The field-oriented harmonic injection unit 506 is used to add the right amount of the harmonic injection to Idr and/or Iqr, and generate the fundamental current references Id1r and Iq1r, and the jth-order harmonic current references Idjr and Iqjr, etc. The harmonic injection may be based on one harmonic frequency or multiple harmonic frequencies.

It should be noted if more than one harmonic frequency is necessary, additional harmonics can be added, and the field-oriented harmonic injection unit 506 may be modified accordingly, thereby generating the corresponding current references of the additional harmonics. In addition, phase current control, including harmonic injection, may be implemented in the synchronous d-q frame, in a stationary frame, or per phase. A per phase control scheme is used to describe the control process in the following sections.

In the per phase control, the current reference for each phase can be obtained through the harmonic inverse Park & Clarke transform unit 508. The harmonic inverse Park & Clarke transform unit 508 calculates the sum of the fundamental and the harmonic components of the phase current through the coordinate transfer matrixes at both the fundamental frequency and the harmonic frequency (frequencies).

The duty cycles of the power inverters 512 are generated by the phase current control unit 510. As shown in FIG. 5, the phase current control unit 510 comprises a plurality of phase current regulators and a duty cycle neutralizer. The phase current control unit 510 is configured to receive the reference current signals from the harmonic inverse Park & Clarke transform unit 508 and the detected phase currents from the motor. Based on these signals, the phase current control unit 510 determines the duty cycles $D_{11}$-$D_{mn}$ accordingly. In other phase control (for example d-q control) schemes, the duty cycles of the power inverters may be generated through suitable coordinate transfer and/or modulation mechanisms.

It should be noted although the reference for each phase current ($I_{11r}$ through $I_{nmr}$) can be generated, it is not necessary to control all of the phase currents in a close-loop manner. As the sum of the phase currents in each group is equal to zero, some of the phase currents (e.g., one phase in each group) may not be controlled in a close-loop manner to avoid control conflicts. Instead, one phase in each group may be controlled through the duty cycle neutralizer in the phase current control unit 510. The duty cycle neutralizer calculates the duty cycle of the phase through the duty cycles of other phases in the group. For example, if half-bridge converters are used in a group, the average duty cycle of the phases at any switch cycle may be set to zero. Alternatively, the dominating phase (the phase having the maximum phase voltage value) may not be switched (with the right switch in the phase kept on) if a sinusoidal modulation is used. Other modulation schemes including various space vector modulation control schemes may also be used to control all phase currents in a group.

The power inverters 512 are employed to generate appropriate voltages $V_{11}$ through $V_{nm}$ applied to each phase winding. The voltages $V_{ii}$ through $V_{nm}$ generate the phase currents $I_{11}$ through $I_{nm}$.

It should be noted that the harmonic coordinate transfer matrixes in the Clark transfer and Park transfer are similar to the counterpart of the fundamental frequency except that the triangle functions now use the frequency and phase angles of the corresponding harmonic frequency. It should further be noted that, with a suitable harmonic frequency, the harmonic system can also be a balanced multi-phase system. In the balanced multi-phase system, through a jth-order harmonic Park transfer, the jth-order harmonic components are converted into dc values in the d-q frame, but the other components are equal to zero. That is, a jth-order harmonic park transfer is an effective filter which keeps the information of the jth-order harmonics, but removes the information of the components of other frequencies. This can be used to decouple different harmonics and maintain a good field-oriented torque and better flux control. Using this feature, the field-oriented control can be easily implemented for each desired harmonic if necessary. Alternatively, the field-oriented control can be implemented at the fundamental frequency, and then the harmonic current references are added at the right frequencies when needed.

Figure 6:
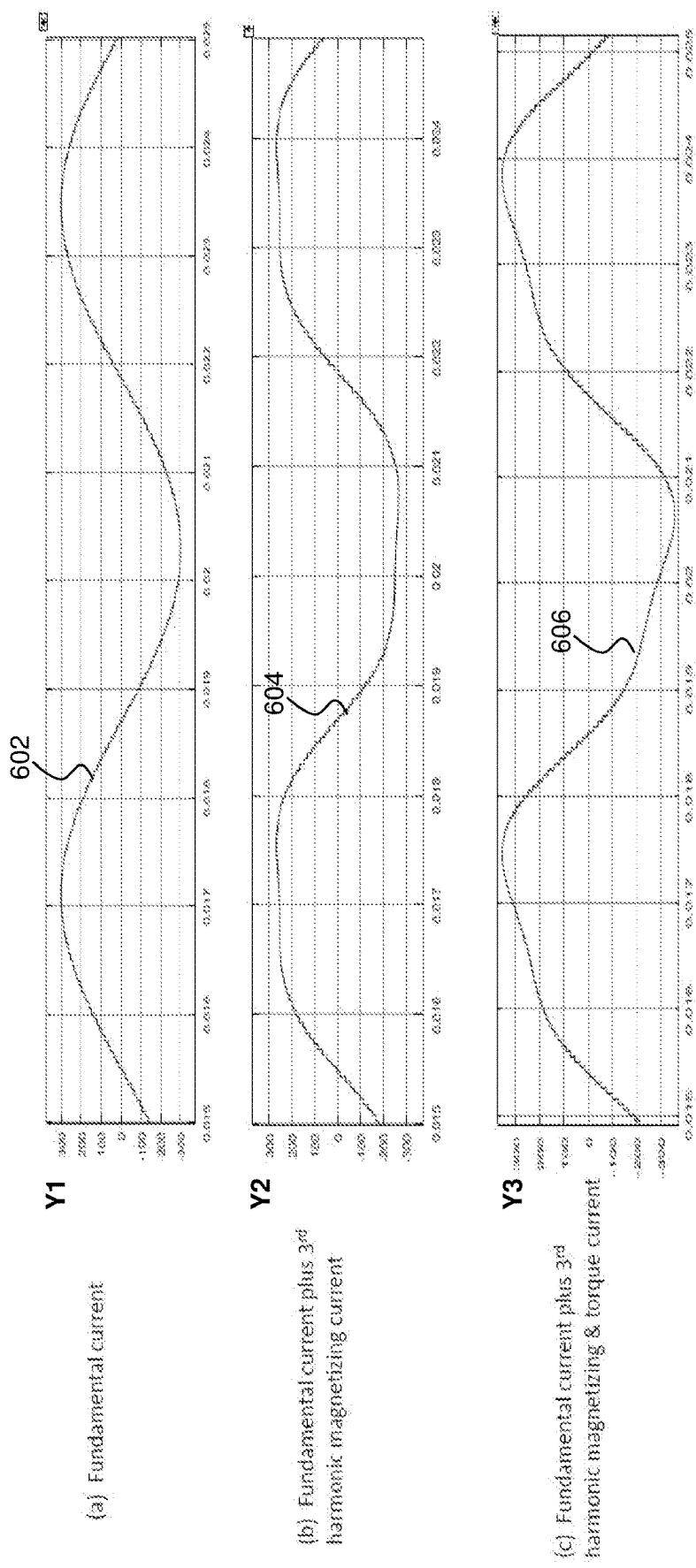
FIG. 6 shown some exemplary current waveforms of the field-oriented harmonic injection in accordance with various embodiments of the present disclosure.

FIG. 6 shown some exemplary current waveforms of the field-oriented harmonic injection in accordance with various embodiments of the present disclosure. The horizontal axis of FIG. 6 represents intervals of time. There may be three vertical axes. The first vertical axis Y1 represents the fundamental current flowing into the motor. The second vertical axis Y2 represents the combination of the fundamental current and the third-order magnetizing current. The third vertical axis Y3 represents the combination of the fundamental current, the third-order magnetizing current and the third-order torque current.

A first waveform 602 is a sinusoidal fundamental waveform. A second waveform 604 includes both the fundamental current and the third-order magnetizing current. As shown in FIG. 6, the second waveform 604 has a relatively flat top after the third-order magnetizing current has been added into the fundamental current. A third waveform 606 is the sum of the fundamental current, the third-order magnetizing current and the third-order torque current.

Figure 7:
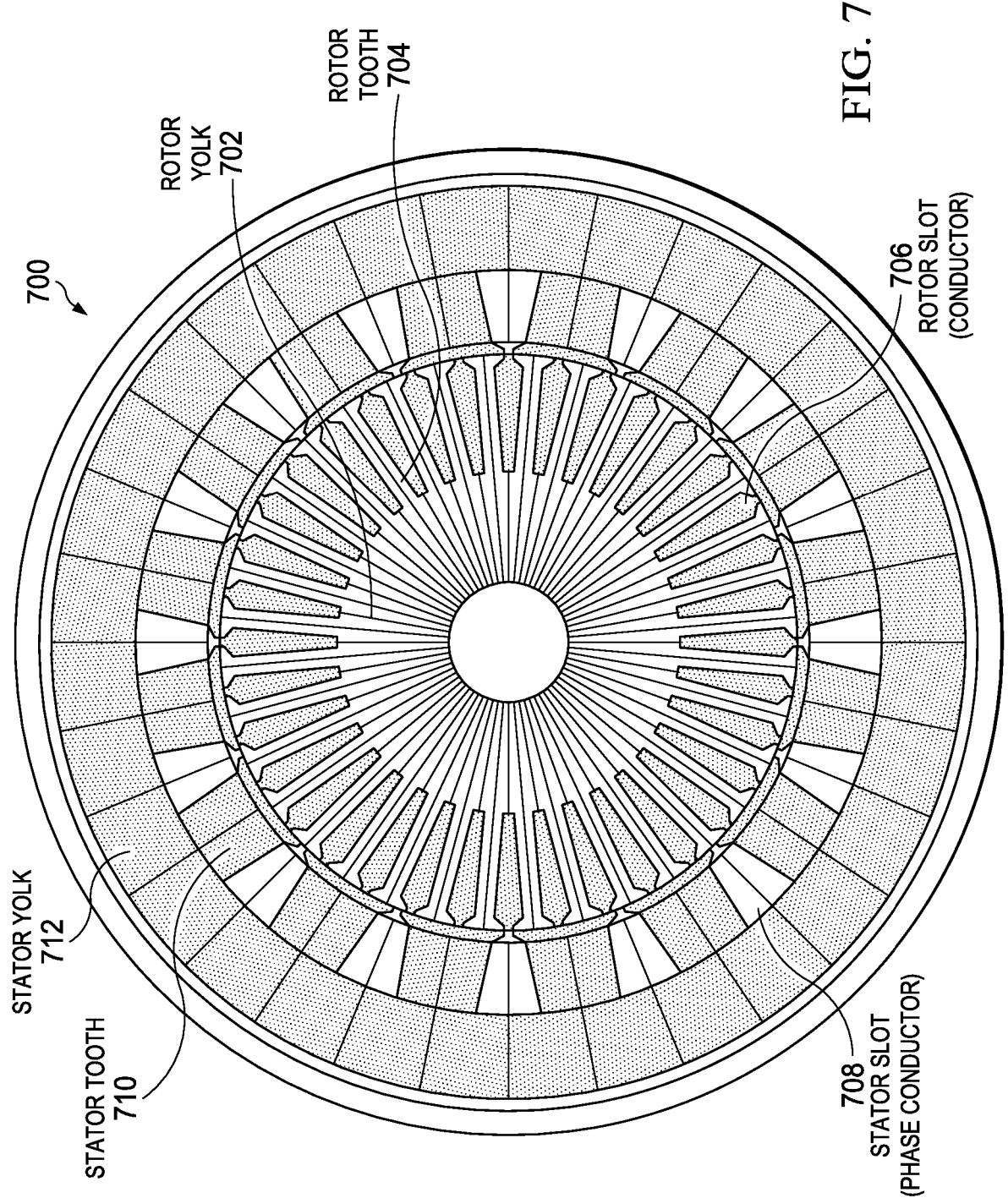
FIG. 7 shows an exemplary induction motor in accordance with various embodiments of the present disclosure.

FIG. 7 shows an exemplary induction motor in accordance with various embodiments of the present disclosure. The induction motor 700 includes a stator and a rotor. The stator includes 16 stator slots 708. Each stator slot is formed between two adjacent stator teeth 710. The stator teeth 710 are formed on a stator yoke 712. One phase conductor is placed in each stator slot. The rotor includes many rotor slots 706. Each rotor slot is formed between two adjacent rotor teeth 704. The rotor teeth 704 are formed on a rotor yoke 702. The conductors in the rotor slots are coupled to the stator magnetically through an air gap.

It should be noted the radial flux structure shown in FIG. 7 is merely an example. Other suitable flux structures such as an axial flux structure can also be used.

The rotor conductors may form a squirrel cage structure, which can produce currents in response to the magnetic field in the air gap, and produce a mechanical torque at the fundamental frequency and possibly harmonic frequencies at the same time. In alternative embodiments, the rotor may be a permanent magnet structure, which may produce a fundamental frequency magnetic field as well as harmonic components in the air gap.

The stator currents may be controlled to have both the fundamental component and the harmonic components, which may generate the mechanical torque at the fundamental frequency and/or the harmonic frequencies. Other magnetic structures can also produce mechanical torques at the fundamental frequency and the harmonic frequencies through the interaction between magnetic fields produced by the rotor and the stator. Through the harmonic injection, the current waveform in each winding may be shaped to produce a desired performance improvement such as high torque density, lower torque ripples, better noise or vibration performance and the like.

Different rotor structures may require different stator-induced magnetic fields. Through the field-oriented harmonic injection, the magnetic field generated by the stator windings can be shaped to have an optimum interaction with the rotor, thereby improving the torque capability and other performance at the same time. Of course, the motor may operate in both a motor mode and a generator mode with the field-oriented harmonic injection.

Figure 8:
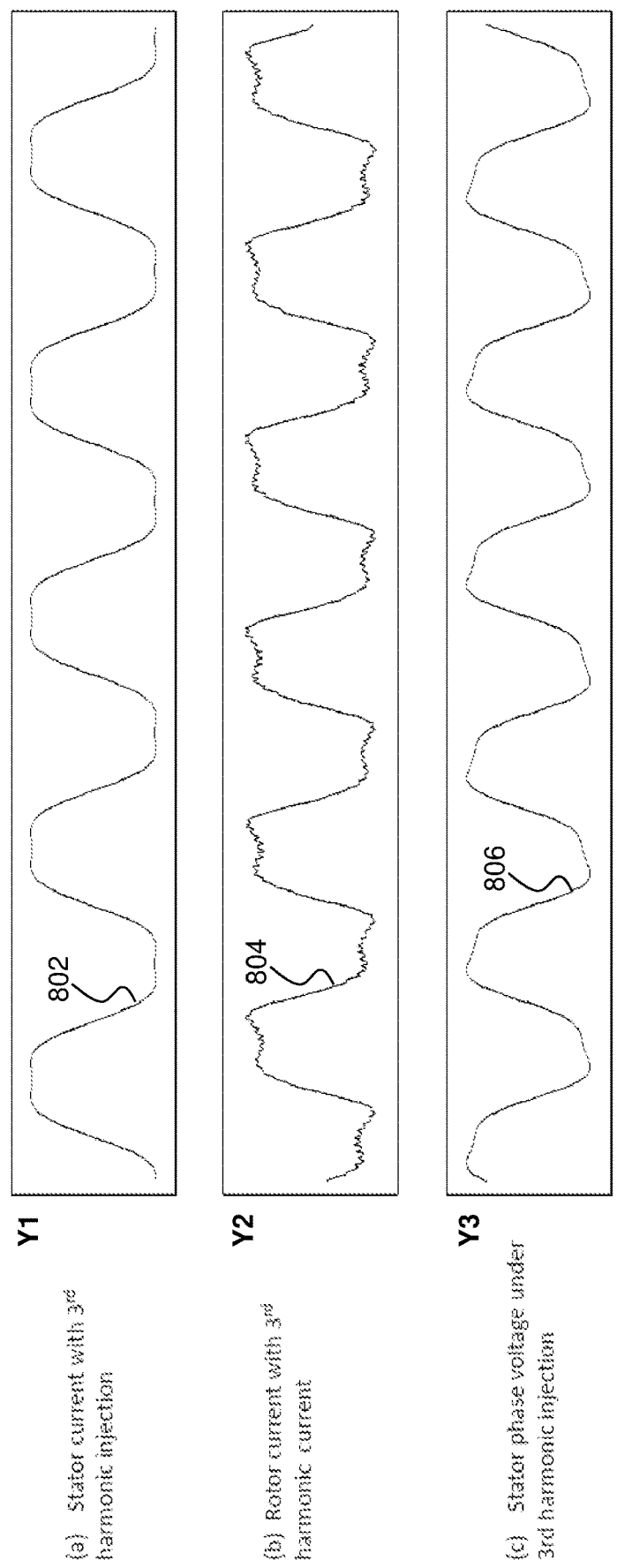
FIG. 8 shows various simulation waveforms in an induction machine in accordance with various embodiments of the present disclosure.

FIG. 8 shows various simulation waveforms in an induction machine in accordance with various embodiments of the present disclosure. The horizontal axis of FIG. 8 represents intervals of time. There may be three vertical axes. The first vertical axis Y1 represents the stator current with the third-order harmonic injection. The second vertical axis Y2 represents the rotor current with the third-order harmonic injection. The third vertical axis Y3 represents the stator phase voltage under the third-order harmonic injection.

A first waveform 802 is a quasi-square waveform after the third-order harmonic has been injected into the motor system. A second waveform 804 is another quasi-square waveform. A third waveform 806 is the corresponding voltage waveform for the stator winding. The voltage does not have a flat top (e.g., the quasi-square waveform). In some embodiments, such voltage waveform can be used to get a desired current waveform through an open-loop control mechanism such as voltage/frequency (V/F) control.

Figure 9:
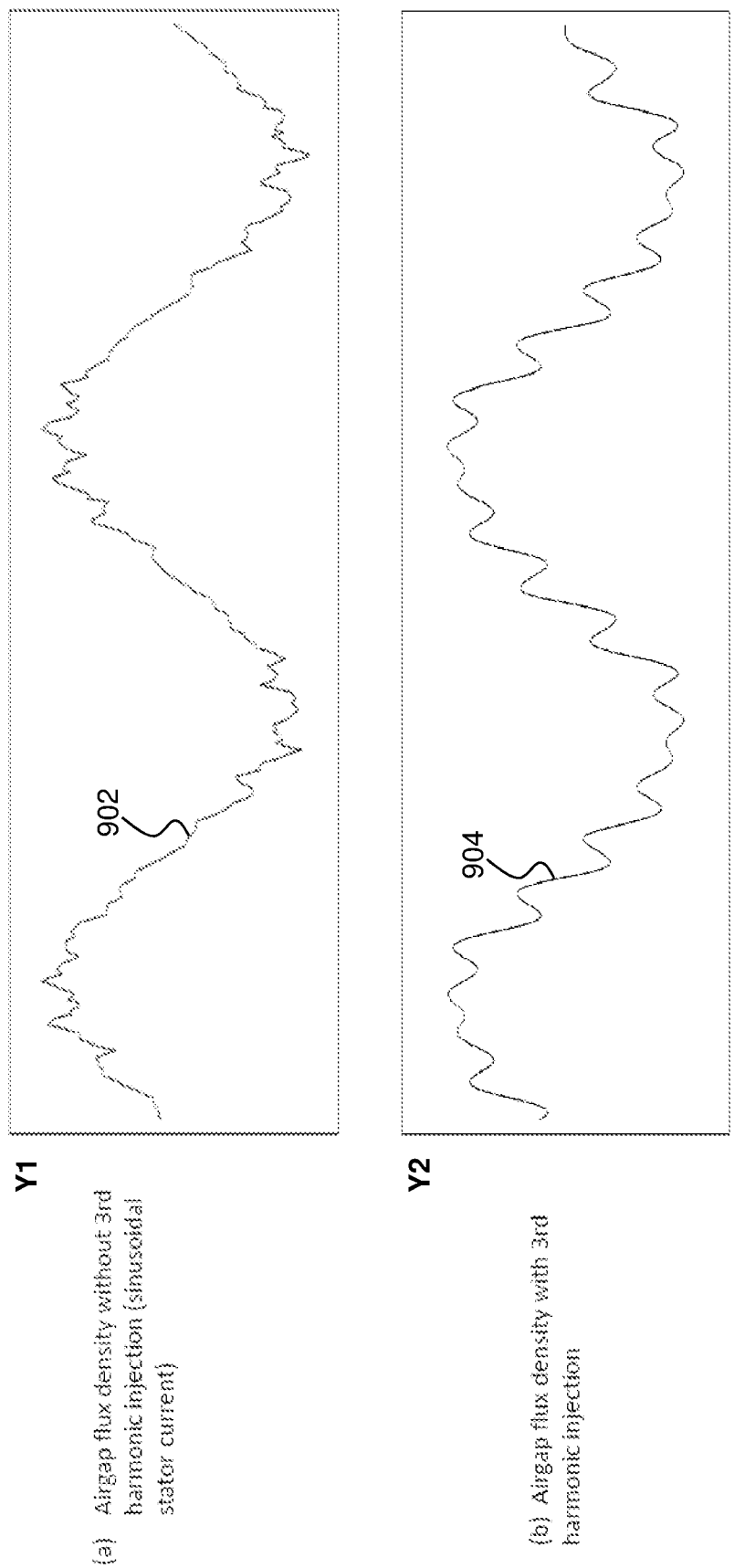
FIG. 9 illustrates two different magnetic field distributions in the air gap in accordance with various embodiments of the present disclosure.

FIG. 9 illustrates two different magnetic field distributions in the air gap in accordance with various embodiments of the present disclosure. The horizontal axis of FIG. 9 represents intervals of time. There are two vertical axes. The first vertical axis Y1 represents the airgap flux density without the third-order harmonic injection. The second vertical axis Y2 represents the airgap flux density with the third-order harmonic injection.

A first waveform 902 shows the air gap magnetic field spatial distribution with sinusoidal stator currents. A more or less sinusoidal envelop can be seen from the first waveform 902. A second waveform 904 is the air gap magnetic field spatial distribution with quasi-square waveform stator currents. A more or less quasi-square waveform envelop can be seen from the second waveform 904. This shows that with the field-oriented harmonic injection, the toque enhancement can be achieved by utilizing the energy in the harmonic magnetizing field. This feature can be used to improve the performance of machines.

The implementations above are based on closed-loop field-oriented control mechanisms. The principle of the field-oriented harmonic injection can also be used in open loop control mechanisms such as voltage/frequency control, which is usually used in the general industry or consumer applications, as well as in the starting process of field-oriented control systems to avoid the complexity and difficulties of applying the field-oriented control at a very low frequency/speed range. The waveform 806 shown in FIG. 8 gives a good reference on the desired voltage waveform where the voltage references can be modified by adding harmonic components. The harmonic components can be obtained from various methods such as calculation, testing, or simulation according to the operating condition. The required voltage harmonics can be obtained for the desired harmonic current components which may include magnetizing components and/or torque components for suitable harmonic frequencies.

Although the discussion above is based on a harmonic injection control mechanism, the method to improve the system operation using a physics-based performance index can be also used on the fundamental frequency only. For example, when the harmonic injection control mechanism is not used, only fundamental frequency components are considered, and the calculation of the performance index becomes much simpler with the key variables being $I_{d1}$ and $I_{q1}$. As the calculation can be finished offline for the optimized values, such values can be stored in one or more tables for the whole operating range. Variations regarding to different temperatures may be also considered by creating multiple tables, each corresponding to a temperature point, and interpolation can be used to calculated values between two adjacent temperature points. It is also possible to establish a simple analytic model to consider the effect of the temperature variations, so the values at different temperatures can be calculated using this model.

Figure 10:
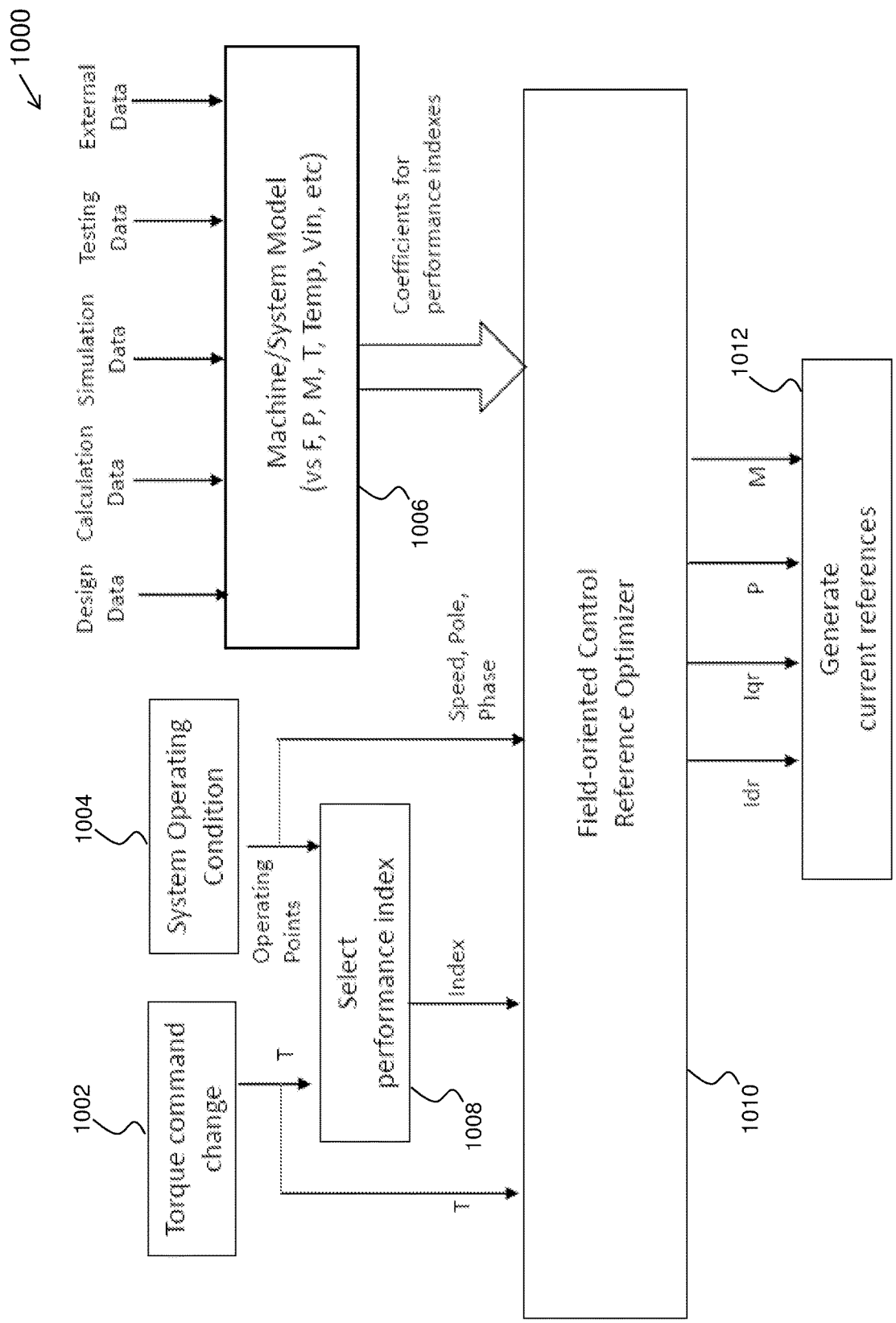
FIG. 10 shows a block diagram of a control system using a physics-based performance index in efficiency optimization in accordance with various embodiments of the present disclosure.

FIG. 10 shows a block diagram of a control system using a physics-based performance index in efficiency optimization in accordance with various embodiments of the present disclosure. The control system 1000 comprises a torque command change unit 1002, a system operating condition unit 1004, a machine/system model unit 1006, a select performance index unit 1008, a field-oriented control reference optimizer 1010 and a current reference generator 1012.

The torque command change unit 1002 considers dynamic changes of the number of poles. As shown in FIG. 10, the pole number change information is fed into the select performance index unit 1008 and the field-oriented control reference optimizer 1010. The design data, calculation data, simulation data and/or testing data, optionally data from other systems with the same or similar design are fed into the machine/system model unit 1006 where the coefficients for performance indexes are generated. The effect of temperature, frequency, torque, speed, input voltage and the like can be incorporated during the process of generating the coefficients for performance indexes. Furthermore, if the dynamic reconfiguration is available, the effect of the pole number and phase number may be also included in the model.

As the variables of performances indexes are currents (e.g., magnetizing component and torque component), this model can be incorporated into the field-oriented control. From a torque reference change, the right performance index can be selected in the select performance index unit 1008 based on operating conditions such as component temperatures, magnetic saturation levels, and other factors including external conditions such as battery state of charge (SoC), tasks to be finished, and the driver preference. For a dynamic reconfiguration, the number of poles and the number of phases may also be considered. Based on the performance index selected, and the coefficients from the model, the current references, and pole/phase numbers if the dynamic reconfiguration is available, can be optimized in the field-oriented control reference optimizer 1010. Please note that the current references may be modified from the calculated optimum values. For example, if a good acceleration is needed based on the driver preference, Idr can be increased based on the calculated value.

The discussion above is based on induction motors. This is merely an example. The technology discussed above can also be applied to other types of motors and generators. For example, in a permanent magnet motor such as a permanent magnet synchronous motor or a brushless dc motor, the harmonic injection may be used to reduce an unwanted high-order flux during some operation conditions to reduce the power loss, thereby improving efficiency and/or torque ripples, or increasing the power/torque density. The desired harmonic injection may be dependent on characteristics, size, shape and location of the permanent magnets, and can be obtained from various methods such as analysis, simulation, calculation, testing, any combinations thereof and the like.

Although embodiments of the present disclosure and its advantages have been described in detail, it should be understood that various changes, substitutions and alterations can be made herein without departing from the spirit and scope of the disclosure as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A method comprising:
   configuring a system with a motor and an inverter, wherein the motor has a plurality of symmetrical windings coupled to the inverter;
   configuring the inverter to inject a plurality of high-order synchronous harmonic currents into the windings of the motor, wherein the high-order synchronous harmonic currents are configured to generate a rotating magnetic field in the motor at the same speed and in the same direction as a magnetic field generated by fundamental currents in the plurality of windings of the motor; and
   in response to an increased phase number, a reduced pole number and a corresponding saturation region change from a tooth area to a yoke area, adjusting a phase-shift of one of the high-order synchronous harmonic currents to reduce a magnetic saturation of the yoke area in the motor and increase a torque of the motor in an operation mode.

2. The method of claim 1, wherein:
   the plurality of high-order harmonic currents are generated by a plurality of high-order harmonics comprising a third-order harmonic.

3. The method of claim 1, wherein:
   the motor is an induction motor.

4. The method of claim 3, wherein the plurality of windings are configured such that a number of poles of the motor can be dynamically adjustable by adjusting currents flowing through the plurality of windings; and
   a controller configured to determine an injection ratio of a high-order harmonic current to a fundamental frequency current.

5. The method of claim 1, further comprising:
   establishing a desirable waveform of current in the plurality of windings for achieving a desirable performance of the system.

6. The method of claim 1, further comprising:
   determining an injection ratio of a high-order harmonic current to a fundamental current, wherein the injection ratio for a magnetizing component is different from the injection ratio for a torque component at a same harmonic frequency.

7. The method of claim 6, further comprising:
   determining the injection ratio based on a power loss of the system or a power loss of a component of the system.

8. The method of claim 6, wherein:
   the motor is a permanent magnet motor.

9. The method of claim 1, wherein:
   the motor is a reluctance motor.

10. A system comprising:
    a motor having a plurality of symmetric windings, a rotor and a stator magnetically coupled to the rotor;
    a plurality of power inverters connected to respective windings, wherein the plurality of power inverters are configured to control currents of the plurality of windings; and
    a controller configured to determine an injection ratio of a high-order synchronous harmonic component to a fundamental component for currents of the plurality of windings, and wherein the high-order synchronous harmonic component is configured to generate a rotating magnetic field at the same speed and in the same direction as a magnetic field generated by the fundamental component, and wherein in response to an increased phase number, a reduced pole number and a corresponding saturation region change from a tooth area to a yoke area, a phase-shift of one of the high-order synchronous harmonic currents is adjusted to reduce a magnetic saturation of the yoke area in the motor and increase a torque of the motor in an operation mode.

11. The system of claim 10, wherein the controller comprises:

a first transform unit configured to convert detected current signals of the plurality of windings into current variables in a synchronous d-q frame;

a first field-oriented control unit configured to generate reference magnetizing and torque current signals for the fundamental component; and a second field-oriented control unit configured to generate reference magnetizing and torque current signals in the d-q frame for the high-order harmonic component.

12. The system of claim 11, wherein:

an injection ratio for the high-order harmonic torque current reference to the fundamental torque current reference is different from an injection ratio for the high-order harmonic magnetizing current reference to the fundamental magnetizing current reference.

13. The system of claim 11, wherein:

the high-order synchronous harmonics currents are configured to selectively alleviate magnetic saturation of tooth areas or yoke areas of the stator or the rotor of the motor in different operation modes.

14. The system of claim 10, wherein:

the motor is an induction motor.

15. The system of claim 14, wherein:

the number of poles and the number of phases of the motor are dynamically reconfigurable.

16. A method comprising:

configuring a motor drive system with a motor and an inverter, wherein:

the motor has a stator, a rotor and a plurality of symmetric windings arranged into a plurality of winding groups; and the inverter has a plurality of power converter groups, and wherein each power converter group is configured to control currents of a winding group;

injecting a plurality of high-order synchronous harmonic currents into the plurality of windings of the motor;

configuring the system such that the high-order synchronous harmonics currents generate a rotating magnetic field at the same speed and in the same direction as a magnetic field generated by fundamental currents of the plurality of windings; and in response to an increased phase number, a reduced pole number and a corresponding saturation region change from a tooth area to a yoke area, adjusting a phase-shift of one of the high-order synchronous harmonic currents to reduce a magnetic saturation of the yoke area in the motor and enhance a torque of the motor in an operation mode.

17. The method of claim 16, further comprising:

dynamically adjusting the number of poles of the motor drive system by adjusting currents flowing through a plurality of windings of the motor drive system.

18. The method of claim 16, further comprising:

converting the synchronous harmonic into a magnetizing current variable and a torque current variable in a d-q frame; and controlling a first injection ratio of the magnetizing current variable to a fundamental magnetizing current and a second injection ratio of the torque current variable to the fundamental torque current independently.

19. The method of claim 18, further comprising:

determining the first injection ratio and the second injection ratio based on a power loss of the motor drive system or a power loss of a component of the motor drive system.

20. The method of claim 16, further comprising:

configuring the high-order synchronous harmonics currents to selectively alleviate magnetic saturation of tooth areas or yoke areas of the stator or the rotor of the motor in different operation modes.

* * * * *